United States Patent
Hwang et al.

(10) Patent No.: US 9,218,085 B2
(45) Date of Patent: Dec. 22, 2015

(54) DISPLAY DEVICE WITH INTEGRATED SELF-CAPACITIVE AND IN-CELL TYPE TOUCH SCREEN

(71) Applicant: LG DISPLAY CO., LTD., Seoul (KR)

(72) Inventors: Sang Soo Hwang, Seoul (KR); Tae Hwan Kim, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 14/144,178

(22) Filed: Dec. 30, 2013

(65) Prior Publication Data

US 2014/0240279 A1    Aug. 28, 2014

(30) Foreign Application Priority Data

Feb. 22, 2013    (KR) ........................ 10-2013-0019167

(51) Int. Cl.
*G06F 3/041* (2006.01)
*G06F 3/044* (2006.01)

(52) U.S. Cl.
CPC .............. *G06F 3/0412* (2013.01); *G06F 3/044* (2013.01)

(58) Field of Classification Search
None
See application file for complete search history.

(56) References Cited

U.S. PATENT DOCUMENTS

| | | | |
|---|---|---|---|
| 2010/0194697 A1* | 8/2010 | Hotelling et al. | 345/173 |
| 2010/0253638 A1* | 10/2010 | Yousefpor et al. | 345/173 |
| 2011/0169759 A1* | 7/2011 | Wang et al. | 345/173 |
| 2011/0267295 A1* | 11/2011 | Noguchi et al. | 345/173 |
| 2012/0218199 A1 | 8/2012 | Kim et al. | |
| 2013/0147724 A1* | 6/2013 | Hwang et al. | 345/173 |
| 2013/0241868 A1* | 9/2013 | Kim et al. | 345/174 |
| 2013/0321296 A1* | 12/2013 | Lee et al. | 345/173 |
| 2013/0335342 A1* | 12/2013 | Kim et al. | 345/173 |
| 2013/0335343 A1* | 12/2013 | Lee et al. | 345/173 |
| 2014/0111446 A1* | 4/2014 | Lee et al. | 345/173 |

FOREIGN PATENT DOCUMENTS

TW    201236127 A1    9/2012

* cited by examiner

*Primary Examiner* — David D Davis
(74) *Attorney, Agent, or Firm* — Birch, Stewart, Kolasch & Birch, LLP

(57) ABSTRACT

A display device can include a panel configured to include a plurality of electrodes and a display driver IC that applies a common voltage to the plurality of electrodes, a touch IC configured to generate a touch scan signal, and apply the touch scan signal to the display driver IC. Further, the display device can include a plurality of first link lines configured to connect the plurality of electrodes to the display driver IC in a first direction, and a plurality of second link lines respectively connected to the plurality of electrodes to extend in a second direction opposite to the first direction to contact a distal end of the panel. The display driver IC applies the common voltage or the touch scan signal to the plurality of electrodes through the plurality of first link lines according to a driving mode of the panel.

9 Claims, 4 Drawing Sheets

DISPLAY DEVICE WITH INTEGRATED SELF-CAPACITIVE AND IN-CELL TYPE TOUCH SCREEN

CROSS-REFERENCE TO RELATED APPLICATIONS

This application claims the benefit of the Korean Patent Application No. 10-2013-0019167 filed on Feb. 22, 2013, which is hereby incorporated by reference as if fully set forth herein.

BACKGROUND

1. Field of the Invention

The present invention relates to a display device, and more particularly, to a display device with integrated touch screen.

2. Discussion of the Related Art

Touch screens are a type of input device that is included in image display devices such as liquid crystal display (LCD) devices, field emission displays (FEDs), plasma display panels (PDPs), electroluminescent displays (ELDs), and electrophoretic displays (EPDs), and allows a user to input predetermined information by applying a pressure (i.e., pressing or touching) to a touch sensor of a touch screen while looking at the image display device.

The touch screen applied to display devices is categorized into an add-on type, an on-cell type, and an in-cell type depending on a structure thereof. The add-on type is a type in which a display device and a touch screen are separately manufactured, and the touch screen is adhered to an upper substrate of the display device. The on-cell type is a type in which a plurality of elements configuring a touch screen is provided at a surface of an upper glass substrate of a display device. The in-cell type is a type in which a touch screen is built into a display device, and thus, the display device is thinned, and a durability of the display device increases.

However, since the add-on type touch screen has a structure in which a finished touch screen is mounted on a display device, the add-on type touch screen is thick, and a brightness of the display device becomes dark, causing a reduction in visibility. Also, since the on-cell type touch screen has a structure in which a separate touch screen is provided at a top of a display device, the on-cell type touch screen is thinner than the add-on type touch screen, but due to a plurality of driving electrodes and a plurality of sensing electrodes configuring the touch screen and an insulating layer respectively connecting the plurality of driving electrodes and the plurality of sensing electrodes, a total thickness of the add-on type touch screen increases, and the number of processes increases, causing an increase in manufacturing cost.

The in-cell type touch screen can have an enhanced durability and a thin thickness, and thus can solve problems that occur in the add-on type touch screen and the on-cell type touch screen. The in-cell type touch screen is categorized into an optical touch screen and a capacitive touch screen.

The optical touch screen has a type in which a light sensing layer is formed at a thin film transistor (TFT) array substrate of a display device, a backlight unit emits light or infrared light, and light reflected from an object located at a touched position is sensed. However, the optical touch screen has a relatively stabilized drivability when an ambient environment is dark, but when the ambient environment is bright, light stronger than reflected light acts as noise. This is because an intensity of light reflected by an actual touch is very weak, and due to this, when the outside is bright even a little, an error can occur in sensing a touch. Especially, when an ambient environment is exposed to solar light, the optical touch screen cannot sense a touch depending on a case because the solar light is very strong.

The capacitive touch screen is categorized into a self-capacitive touch screen and a mutual capacitive touch screen. The mutual capacitive touch screen has a type in which a plurality of common electrodes are divided into a plurality of driving electrodes and a plurality of sensing electrodes, a mutual capacitance is generated between corresponding driving electrode and sensing electrode, and a touch is sensed by measuring a change amount of mutual capacitance caused by the touch.

However, in the mutual capacitive touch screen, a level of a mutual capacitance generated in sensing a touch is very low, but a parasitic capacitance between a gate line and a data line configuring a display device is very high, for which reason it is difficult to accurately detect a touched position. Also, since a plurality of touch driving lines for a touch driving and a plurality of touch sensing lines for a touch sensing should be formed on a common electrode, the mutual capacitance touch screen has a very complicated line structure.

Moreover, the mutual capacitive touch screen should separately scan the touch driving lines and the touch sensing lines so as to sense a touch, the total number of scans is a value which is obtained by multiplying the number of touch driving lines and the number of touch sensing lines. For example, a touch screen for small-size display devices includes ten touch driving lines and ten touch sensing lines, and thus needs to perform scan at least 100 or more times. The in-cell touch screen needs to perform a touch driving for a very short time, and thus can be applied to only display devices having a very small size.

For this reason, a display device with integrated self-capacitive and in-cell type touch screen is needed for solving the problems of the above-described types of touch screens.

SUMMARY

Accordingly, the present invention is directed to provide a display device with integrated touch screen that substantially obviates one or more problems due to limitations and disadvantages of the related art.

An aspect of the present invention is directed to provide a display device with integrated self-capacitive and in-cell type touch screen in which a plurality of touch sensing elements are formed inside the display device, and thus, a thickness is reduced, and a durability is enhanced.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a display device with integrated touch screen including: a panel configured to include a plurality of electrodes and a display driver IC that applies a common voltage to the plurality of electrodes, a touch IC configured to generate a touch scan signal, and apply the touch scan signal to the display driver IC. Further, the display device can include a plurality of first link lines configured to connect the plurality of electrodes to the display driver IC in a first direction, and a plurality of second link lines respectively connected to the plurality of electrodes to extend in a second direction opposite to the first direction to contact a distal end of the panel. Also the display driver IC can apply the common voltage or the touch scan signal to the plurality of electrodes through the plurality of first link lines according to a driving mode of the panel.

In another aspect of the present invention, there is provided a display device with integrated touch screen including: a panel configured to include a plurality of electrodes and a display driver IC, a touch IC configured to generate a touch scan signal, and apply the touch scan signal to the plurality of electrodes. Further, the display device can include a plurality of first link lines configured to connect the plurality of electrodes to the touch IC in a first direction, and a plurality of second link lines respectively connected to the plurality of electrodes to extend in a second direction opposite to the first direction to contact a distal end of the panel. Also, the display driver IC can apply the common voltage to the touch IC, and the touch IC can apply the common voltage or the touch scan signal to the plurality of electrodes through the plurality of first link lines according to a driving mode of the panel.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Hereinafter, various embodiments of the present invention will be described in detail with reference to the accompanying drawings.

In this disclosure below, for convenience of description, an LCD device will be described as an example of a display device with integrated touch screen according to various embodiments of the present invention, but the present invention may be applied to various display devices such as LCD devices, FEDs, PDPs, ELDs, and EPDs without being limited thereto. Also, a description on a general configuration of the LCD device is not provided.

Figure 1:
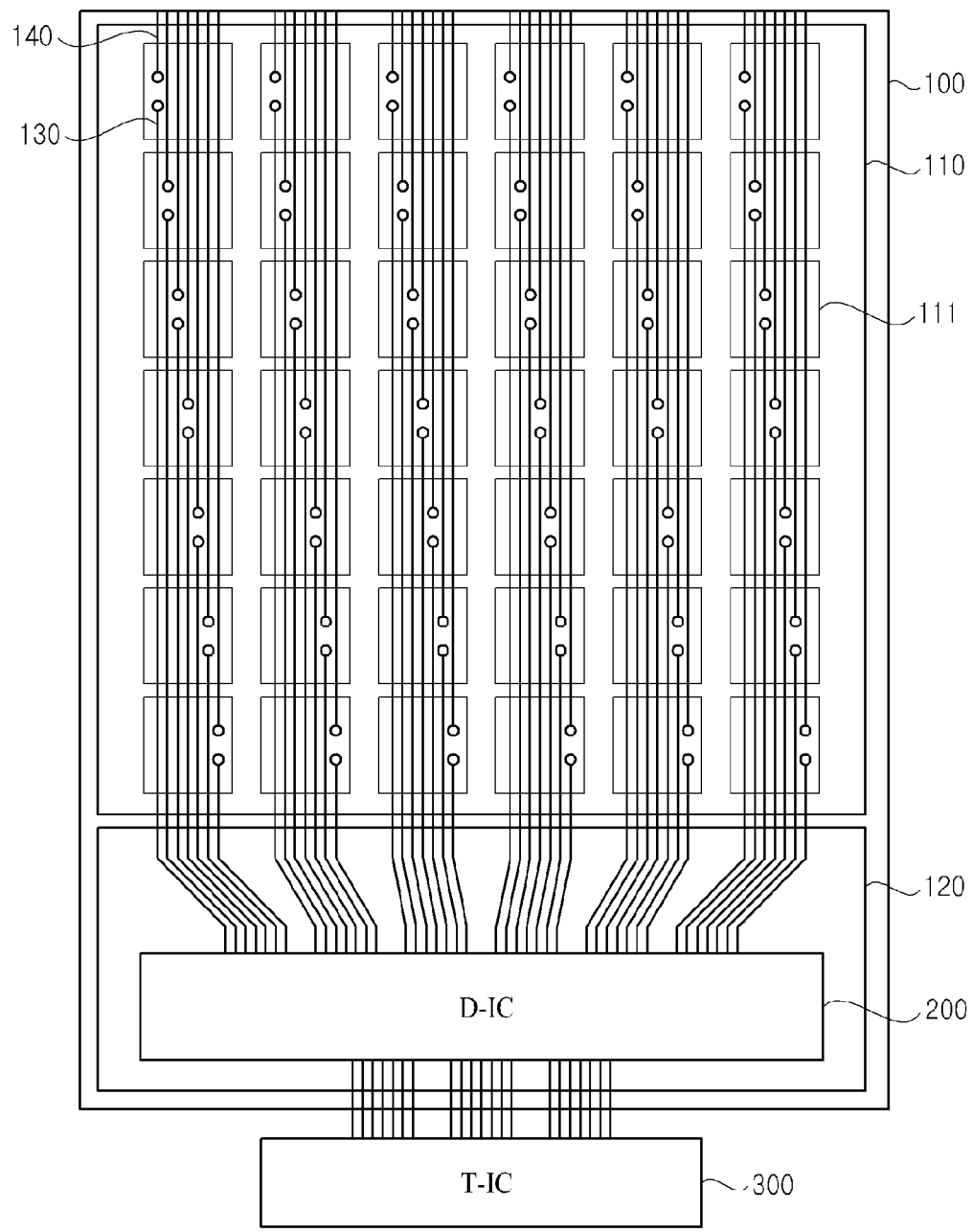
FIG. 1 is a diagram illustrating a configuration of a display device with integrated touch screen according to an embodiment of the present invention.
Figure 2:
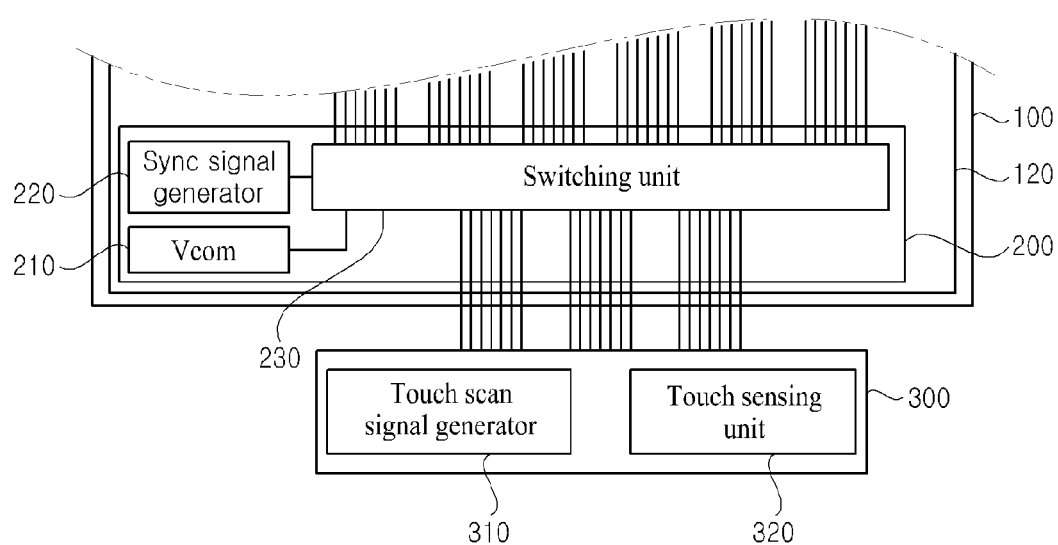
FIG. 2 is a diagram illustrating in detail a connection relationship between a display driver integrated circuit (IC) and a touch IC according to an embodiment of the present invention.

FIG. 1 is a diagram illustrating a configuration of a display device with integrated touch screen according to an embodiment of the present invention, and FIG. 2 is a diagram illustrating in detail a connection relationship between a display driver IC and a touch IC according to an embodiment of the present invention.

The display device with integrated touch screen according to an embodiment of the present invention, as illustrated in FIG. 1, includes a panel 100 including a display driver IC 200 and a touch IC 300.

First, the panel 100 is divided into a display area 110 with a touch screen (not shown) built therein and a non-display area 120 with the display driver IC 200 provided therein. Here, the touch screen senses a position touched by a user, and particularly, the touch screen applied to the present invention is a self-capacitive and in-cell type touch screen in which a display driving and a touch driving are temporally divided and performed.

The panel 100 may be configured as a type in which a liquid crystal layer is formed between two substrates. In this case, a plurality of gate lines, a plurality of data lines intersecting the plurality of gate lines, a plurality of pixels defined by intersections between the data lines and the gate lines, and a plurality of thin film transistors (TFTs) respectively formed in the plurality of pixels are disposed at a lower substrate of the panel 100. Here, the plurality of pixels are arranged in a matrix type corresponding to an intersection structure of the data lines and the gate lines.

Moreover, the panel 100 includes a plurality of electrodes 111 and a plurality of link lines 130 and 140. Here, the plurality of electrodes 111 are formed in the display area 110 of the panel 100, and overlap a plurality of pixel electrodes. In other words, the plurality of electrodes 111 are not formed in all of the plurality of pixels but are formed in the display area 110 overlapping a plurality of pixels.

Each of the electrodes 111 operates as a common electrode that drives a liquid crystal along with a pixel electrode formed in each pixel during a display driving period, and operates as a touch electrode that senses a touched position according to a touch scan signal applied from the touch IC 300 during a touch driving period.

The plurality of link lines are divided into a plurality of first link lines 130 and a plurality of second link lines 140. The plurality of first link lines 130 connects a plurality of electrodes to the display driver IC 200 in a first direction, respectively. The plurality of second link lines 140 are respectively connected to a plurality of electrodes, and extend in a second direction opposite to the first direction.

For example, as illustrated in FIG. 1, the plurality of first link lines 130 connect a plurality of electrodes 111 to the display driver IC 200, and thus allows a touch scan signal and a common voltage, output from the display driver IC 200, to be applied to the plurality of electrodes 111 through respective lines.

Especially, the plurality of second link lines 140 may contact the panel 100 at a distal end of the panel 100.

As described above, when the plurality of second link lines 140 contact the distal end of the panel 100, the following effects can be obtained. For example, when the plurality of first link lines 130 contact the display driver IC 200 without the second link lines 140, the plurality of first link lines 130 are all floated before being attached to the display driver IC 200, and thus are vulnerable to a static electricity. To solve such a problem, the plurality of second link lines 140 are respectively connected to a plurality of electrodes at an upper portion of the panel 100, namely, in a direction opposite to a direction attached to the display driver IC 200, and then, by connecting the plurality of first link lines 130 to the distal end of the panel 100, a static electricity can be prevented from occurring in the plurality of first link lines 130. Here, a shorting bar may be formed at the distal end of the panel 100, in which case the plurality of second link lines 140 may be connected to the shorting bar at the distal end of the panel 100.

The display driver IC 200 applies the common voltage or the touch scan signal to the plurality of electrodes 111 through the plurality of first link lines 130 according to a driving mode of the panel 100.

In other words, when the driving mode of the panel 100 is the display driving mode, the display driver IC 200 applies the common voltage to the plurality of electrodes 111, thereby allowing the panel 100 to perform a display driving. When the driving mode of the panel 100 is the touch driving mode, the display driver IC 200 applies the touch scan signal to the plurality of electrodes 111, thereby allowing the panel 100 to perform a touch driving.

In particular, when the driving mode of the panel 100 is the touch driving mode, the display driver IC 200 may divide the electrodes of the panel 100 into a plurality of groups, and may sequentially apply the touch scan signal to the plurality of groups. For example, when the electrodes of the panel 100 are divided into two groups, the display driver IC 200 may apply the common voltage to all the electrodes of the panel 100 during the display driving mode, and during the touch driving mode, the display driver IC 200 may sequentially apply the touch scan signal to first and second groups.

Moreover, as illustrated in FIG. 2, the display driver IC 200 may include a common voltage generator 210, a sync signal generator 220, and a switching unit 230, for driving the plurality of electrodes 111 as a plurality of common electrodes or a plurality of touch electrodes.

The common voltage generator 210 generates the common voltage (Vcom), and applies the common voltage to the switching unit 230. In other words, when the driving mode of the panel 100 is the display driving mode, the common voltage generator 210 generates the common voltage which is applied to the plurality of electrodes so as to output an image, and applies the common voltage to the switching unit 230.

The sync signal generator 220 generates a sync signal that indicates the display driving mode and the touch driving mode. For example, the sync signal generator 220 generates the sync signal that allows the common voltage (Vcom), generated by the common voltage generator 210, to be applied to the plurality of electrodes 111 through the switching unit 230, or allows the touch scan signal to be applied to the plurality of electrodes 111, according to the display driving mode and the touch driving mode.

The switching unit 230 connects the common voltage generator 210 to the plurality of electrodes 111 or connects the touch IC 300 to the plurality of electrodes 111, according to the sync signal. For example, a plurality of the switching units 230 may connect the common voltage generator 210 or the touch IC 300 to the plurality of electrodes 111. When the sync signal of the sync signal generator 220 is a sync signal indicating the display driving mode, the plurality of switching units 230 may connect the common voltage generator 210 to the plurality of electrodes 111. When the sync signal of the sync signal generator 220 is a sync signal indicating the touch driving mode, the plurality of switching units 230 may connect the touch IC 300 to the plurality of electrodes 111.

Finally, the touch IC 300 applies the touch scan signal to the plurality of electrodes 111 through the display driver IC 200, and detects a capacitance change at each of the plurality of electrodes 111 to determine whether each electrode is touched.

For example, as illustrated in FIG. 2, the touch IC 300 according to an embodiment of the present invention may include a touch scan signal generator 310 that generates the touch scan signal which is applied to the plurality of electrodes so as to sense a touch. The touch scan signal may be a touch driving voltage, which may have a level higher than that of the common voltage that is applied to the plurality of electrodes of the panel 100 for a display driving. In this case, the touch driving voltage may have a voltage corresponding to the common voltage as a low-level voltage, and may have a voltage higher than the voltage as a high-level voltage. Here, the touch scan signal generator 310 is connected to the plurality of electrodes 111 through the switching unit 230 of the display driver IC 200.

Moreover, the touch IC 300 may include a touch sensing unit 320 that receives a plurality of touch sensing signals from the plurality of electrodes 111 according to the touch scan signal to calculate touch coordinates, and senses a touch input position by a user. The calculated touch coordinates may be transferred to a system part of the display device, and may be used to detect the user's touch coordinates occurring in the panel 100. Here, the touch sensing unit 320 is connected to the plurality of electrodes 111 through the switching unit 230 of the display driver IC 200.

Hereinafter, a display device with integrated touch screen according to another embodiment of the present invention will be described in detail with reference to FIGS. 3 and 4.

Figure 3:
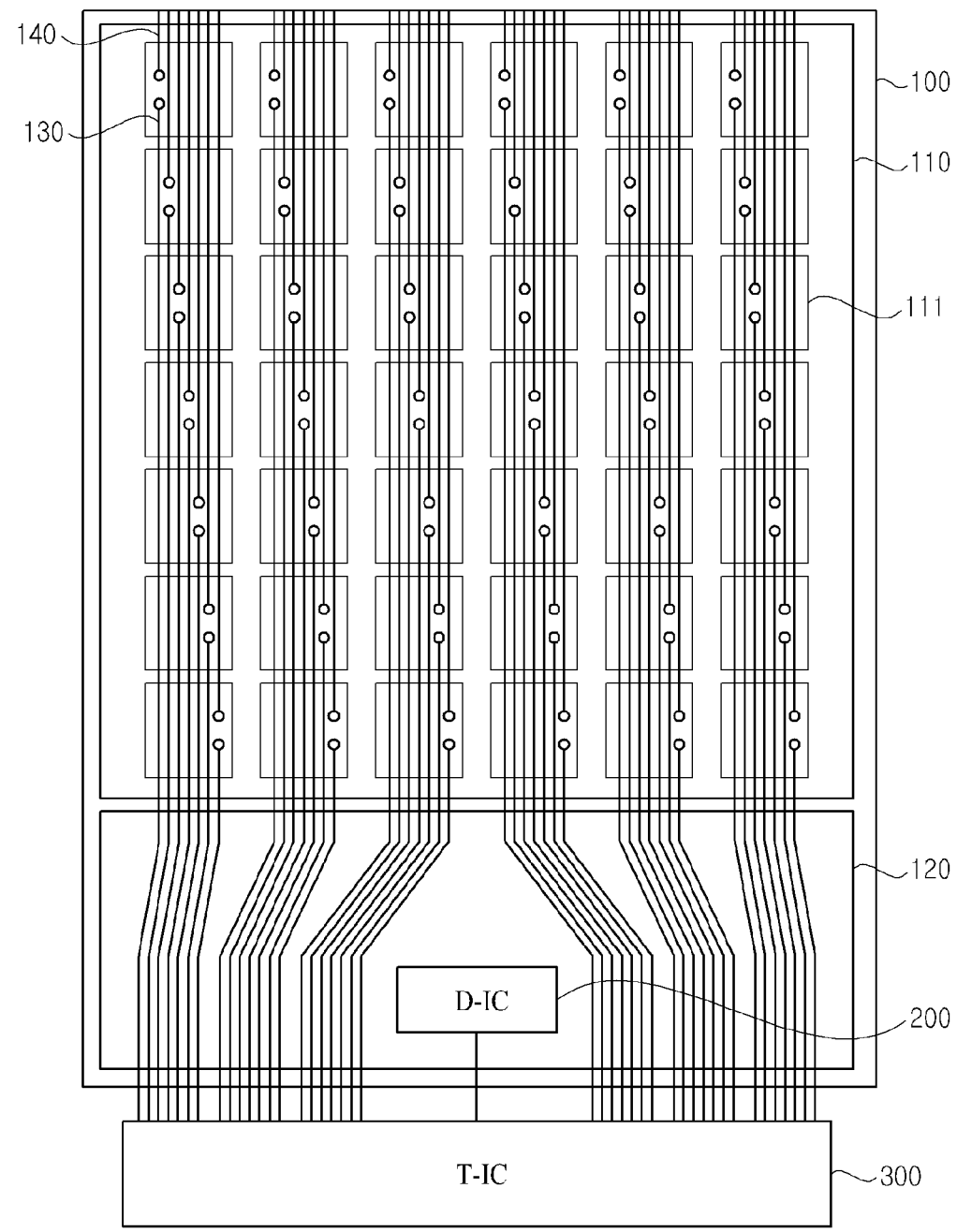
FIG. 3 is a diagram illustrating a configuration of a display device with integrated touch screen according to another embodiment of the present invention.
Figure 4:
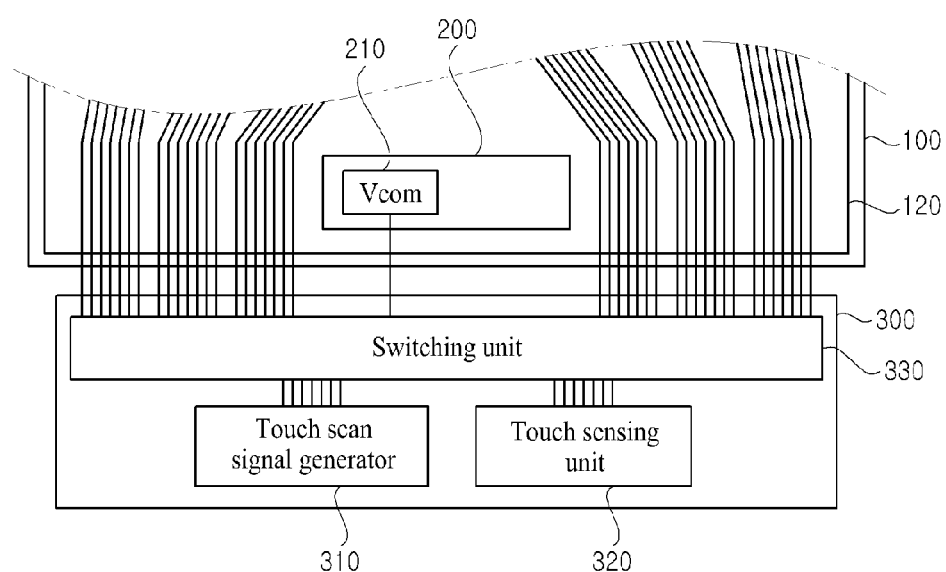
FIG. 4 is a diagram illustrating in detail a connection relationship between a display driver IC and a touch IC according to another embodiment of the present invention.

FIG. 3 is a diagram illustrating a configuration of a display device with integrated touch screen according to another embodiment of the present invention, and FIG. 4 is a diagram illustrating in detail a connection relationship between a display driver IC and a touch IC according to another embodiment of the present invention.

The display device with integrated touch screen according to another embodiment of the present invention, as illustrated in FIG. 3, includes a panel 100 including a display driver IC 200 and a touch IC 300.

First, the panel 100 is divided into a display area 110 with a touch screen (not shown) built therein and a non-display area 120 with the display driver IC 200 provided therein. Here, the touch screen senses a position touched by a user, and particularly, the touch screen applied to the present invention is a self-capacitive and in-cell type touch screen in which a display driving and a touch driving are temporally divided and performed.

The panel 100 may be configured as a type in which a liquid crystal layer is formed between two substrates. In this case, a plurality of gate lines, a plurality of data lines intersecting the plurality of gate lines, a plurality of pixels defined by intersections between the data lines and the gate lines, and a plurality of thin film transistors (TFTs) respectively formed in the plurality of pixels are disposed at a lower substrate of the panel 100. Here, the plurality of pixels are arranged in a matrix type corresponding to an intersection structure of the data lines and the gate lines.

Moreover, the panel 100 includes a plurality of electrodes 111 and a plurality of link lines 130 and 140. Here, the plurality of electrodes 111 are formed in the display area 110 of the panel 100, and overlap a plurality of pixel electrodes. In other words, the plurality of electrodes 111 are not formed in all of the plurality of pixels but are formed in the display area 110 overlapping a plurality of pixels. Each of the electrodes 111 operates as a common electrode that drives a liquid crystal along with a pixel electrode formed in each pixel during a display driving period, and operates as a touch electrode that senses a touched position according to a touch scan signal applied from the touch IC 300 during a touch driving period.

The plurality of link lines are divided into a plurality of first link lines 130 and a plurality of second link lines 140. The plurality of first link lines 130 connects a plurality of electrodes to the touch IC 300 in a first direction, respectively. The plurality of second link lines 140 are respectively connected to a plurality of electrodes, and extend in a second direction opposite to the first direction.

For example, as illustrated in FIG. 3, the plurality of first link lines 130 connect a plurality of electrodes 111 to the touch IC 300, and thus allows a touch scan signal and a common voltage, output from the touch IC 300, to be applied to the plurality of electrodes 111 through respective lines.

Especially, the plurality of second link lines 140 may contact the panel 100 at a distal end of the panel 100.

As described above, when the plurality of second link lines 140 contact the distal end of the panel 100, the following effects can be obtained. For example, when the plurality of first link lines 130 contact the display driver IC 200 without the second link lines 140, the plurality of first link lines 130 are all floated before being attached to the display driver IC 200, and thus are vulnerable to a static electricity. To solve such a problem, the plurality of second link lines 140 are respectively connected to a plurality of electrodes at an upper portion of the panel 100, namely, in a direction opposite to a direction attached to the display driver IC 200, and then, by connecting the plurality of first link lines 130 to the distal end of the panel 100, a static electricity can be prevented from occurring in the plurality of first link lines 130. Here, a shorting bar may be formed at the distal end of the panel 100, in which case the plurality of second link lines 140 may be connected to the shorting bar at the distal end of the panel 100.

The display driver IC 200, as illustrated in FIG. 4, may include a common voltage generator 210 that generates the common voltage, and applies the common voltage to the touch IC 300. Here, the common voltage generator 210 generates the common voltage (Vcom), and applies the common voltage to the touch IC 300. In other words, when the driving mode of the panel 100 is the display driving mode, the common voltage generator 210 generates the common voltage which is applied to the plurality of electrodes so as to output an image, and applies the common voltage to the touch IC 300.

Finally, the touch IC 300 applies the common voltage or the touch scan signal to the plurality of electrodes 111 through the plurality of first link lines 130 according to the driving mode of the panel 100.

In other words, when the driving mode of the panel 100 is the display driving mode, the touch IC 300 applies the common voltage, transferred from the display driver IC 200, to the plurality of electrodes 111, thereby allowing the panel 100 to perform a display driving. When the driving mode of the panel 100 is the touch driving mode, the touch IC 300 applies the generated touch scan signal to the plurality of electrodes 111, thereby allowing the panel 100 to perform a touch driving.

In particular, when the driving mode of the panel 100 is the touch driving mode, the touch IC 300 may divide the electrodes of the panel 100 into a plurality of groups, and may sequentially apply the touch scan signal to the plurality of groups. For example, when the electrodes of the panel 100 are divided into two groups, the touch IC 300 may apply the common voltage to all the electrodes of the panel 100 during the display driving mode, and during the touch driving mode, the touch IC 300 may sequentially apply the touch scan signal to first and second groups.

The touch IC 300 applies the touch scan signal to the plurality of electrodes 111 through the display driver IC 200, and detects a capacitance change at each of the plurality of electrodes 111 to determine whether each electrode is touched.

For example, as illustrated in FIG. 4, the touch IC 300 according to another embodiment of the present invention may include a touch scan signal generator 310 that generates the touch scan signal which is applied to the plurality of electrodes so as to sense a touch. The touch scan signal may be a touch driving voltage, which may have a level higher than that of the common voltage that is applied to the plurality of electrodes of the panel 100 for a display driving. In this case, the touch driving voltage may have a voltage corresponding to the common voltage as a low-level voltage, and may have a voltage higher than the voltage as a high-level voltage. Here, the touch scan signal generator 310 is connected to the plurality of electrodes 111 through the switching unit 330.

Moreover, the touch IC 300 may include a touch sensing unit 320 that receives a plurality of touch sensing signals from the plurality of electrodes 111 according to the touch scan signal to calculate touch coordinates, and senses a touch input position by a user. The calculated touch coordinates may be transferred to a system part of the display device, and may be used to detect the user's touch coordinates occurring in the panel 100. Here, the touch sensing unit 320 is connected to the plurality of electrodes 111 through the switching unit 330.

The switching unit 330 connects the plurality of electrodes 111 to the common voltage generator 210 of the display driver IC 200 or connects the plurality of electrodes 111 to the touch scan signal generator 310 and the touch sensing unit 320, according to the driving mode of the panel 100.

Various methods of driving the display device with integrated touch screen will be described with reference to FIG. 5.

Figure 5:
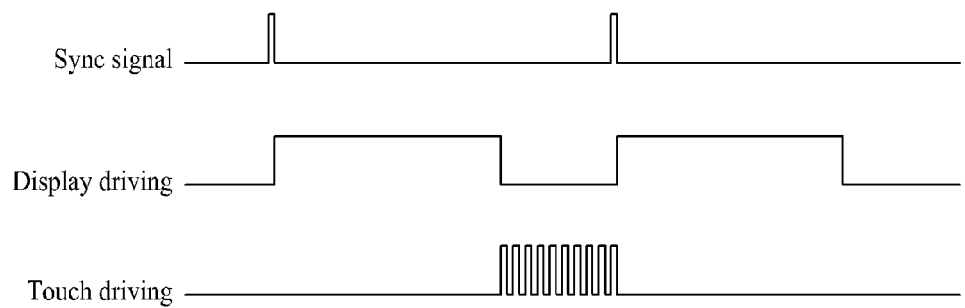
FIG. 5 is a timing chart of signals for a display driving and touch driving of a display device with integrated touch screen according to various embodiments of the present invention.

FIG. 5 is a timing chart of signals for a display driving and touch driving of a display device with integrated touch screen according to various embodiments of the present invention.

As shown in FIG. 5, during one frame, when the driving mode of the panel 100 is the display driving mode, the common voltage is applied to the plurality of electrodes to allow the panel 100 to perform a display driving, and when the driving mode of the panel 100 is the touch driving mode, the touch scan signal is applied to the plurality of electrodes to allow the panel 100 to perform a touch driving.

According to the embodiments of the present invention, since the plurality of touch sensing elements are formed inside the display device, a thickness can be reduced, and a durability can be enhanced.

According to the embodiments of the present invention, since it is not required to separately provide the touch sensing lines and the touch driving lines for a touch sensing, the number of signal lines can be reduced, thus simplifying a line structure and decreasing the total number of scans.

According to the embodiments of the present invention, by providing the link line that connects a plurality of electrodes as one, a vulnerable static electricity characteristic of the touch sensing elements can be compensated for, thus enhancing a yield rate.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display device with integrated touch screen, the display device comprising:
    a panel configured to comprise a plurality of electrodes and a display driver IC that applies a common voltage to the plurality of electrodes;
    a touch IC configured to generate a touch scan signal, and apply the touch scan signal to the display driver IC;
    a plurality of first link lines configured to connect the plurality of electrodes to the display driver IC in a first direction; and
    a plurality of second link lines respectively connected to the plurality of electrodes to extend in a second direction opposite to the first direction to contact a distal end of the panel,
    wherein the display driver IC applies the common voltage or the touch scan signal to the plurality of electrodes through the plurality of first link lines according to a driving mode of the panel.

2. The display device of claim 1, wherein,
    the panel is divided into a display area and a non-display area,
    the plurality of electrodes are formed in the display area, and
    the display driver IC is disposed in the non-display area.

3. The display device of claim 1, wherein,
    when the driving mode of the panel is a display driving mode, the display driver IC applies the common voltage to the plurality of electrodes, and
    when the driving mode of the panel is a touch driving mode, the display driver IC applies the touch scan signal to the plurality of electrodes.

4. The display device of claim 3, wherein the display driver IC comprises:
    a common voltage generator configured to generate the common voltage;
    a sync signal generator configured to generate a sync signal that indicates the display driving mode and the touch driving mode; and
    a switching unit configured to connect the common voltage generator to the plurality of electrodes, or connect the touch IC to the plurality of electrodes, according to the sync signal.

5. The display device of claim 1, wherein the touch IC comprises:
    a touch scan signal generator configured to generate the touch scan signal; and
    a touch sensing unit configured to detect a touch input position of the panel according to the touch scan signal.

6. A display device with integrated touch screen, the display device comprising:
    a panel configured to comprise a plurality of electrodes and a display driver IC;
    a touch IC configured to generate a touch scan signal, and apply the touch scan signal to the plurality of electrodes;
    a plurality of first link lines configured to connect the plurality of electrodes to the touch IC in a first direction; and
    a plurality of second link lines respectively connected to the plurality of electrodes to extend in a second direction opposite to the first direction to contact a distal end of the panel,
    wherein,
    the display driver IC applies the common voltage to the touch IC, and
    the touch IC applies the common voltage or the touch scan signal to the plurality of electrodes through the plurality of first link lines according to a driving mode of the panel.

7. The display device of claim 6, wherein,
    the panel is divided into a display area and a non-display area,
    the plurality of electrodes are formed in the display area, and
    the display driver IC is disposed in the non-display area.

8. The display device of claim 6, wherein,
    when the driving mode of the panel is a display driving mode, the touch IC applies the common voltage to the plurality of electrodes, and
    when the driving mode of the panel is a touch driving mode, the touch IC applies the touch scan signal to the plurality of electrodes.

9. The display device of claim 8, wherein the touch IC comprises:
    a touch scan signal generator configured to generate the touch scan signal;
    a touch sensing unit configured to detect a touch input position of the panel according to the touch scan signal; and
    a switching unit configured to connect the plurality of electrodes to the display driver IC or connect the plurality of electrodes to the touch scan signal generator and the touch sensing unit, according to the driving mode of the panel.

* * * * *